Dec. 6, 1949 W. E. BENJAMIN 2,490,505
SLAPLESS, MAGNETICALLY, RECIPROCABLE STRUCTURE
Filed Jan. 16, 1948
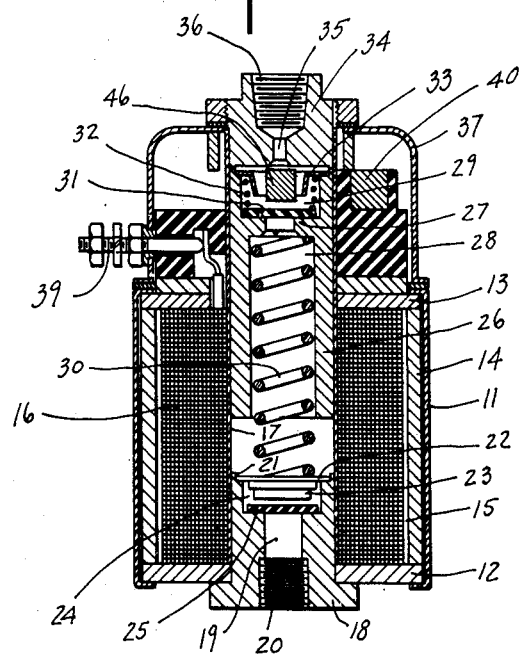
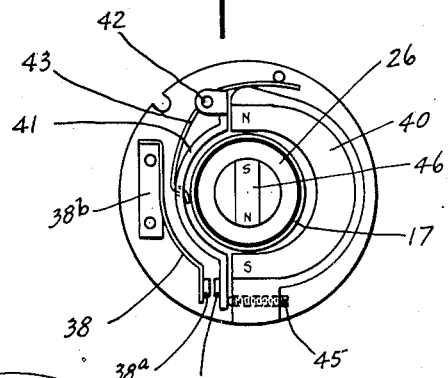
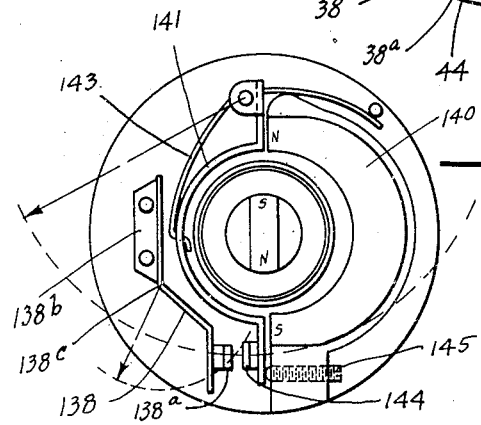
INVENTOR.
WALTER E. BENJAMIN.
BY
Lockwood, Goldsmith & Galt.
ATTORNEYS Patented Dec. 6, 1949

2,490,505

UNITED STATES PATENT OFFICE 2,490,505

SLAPLESS MAGNETICALLY RECIPROCABLE STRUCTURE

Walter E. Benjamin, Anderson, Ind., assignor to The Pierce Governor Company, Inc., Anderson, Ind., a corporation Application January 16, 1948, Serial No. 2,606

5 Claims. (Cl. 172—126)

1

This invention relates to the elimination of slap with its consequent noise in a magnetically reciprocable member.

The chief object of the present invention, as indicated above is to render substantially noiseless a structure of the character specified, and as representative of such, reference is had to the fuel pump disclosed in the Best and Lawler Patent No. 2,322,913, dated June 29, 1943.

Structures of this general type cannot be used commercially upon vehicles because of the objectionable noise created by the piston. Also, it is believed that wherever noise is present, wear is incident thereto, hence elimination of noise, it is believed, in the present invention, eliminates slap so that wear is nominal instead of appreciable in character.

The chief feature of the present invention resides in providing the piston of the patented structure with a cooperating magnet.

Other objects and features of the invention will be set forth more fully hereinafter.

The full nature of the invention will be understood from the accompanying drawings and the following description and claims.

In the drawings

Fig. 1 is a central sectional view of a pump embodiment of the invention.

Fig. 2 is a top plan view of control switch portion of the pump with the invention incorporated in the piston of said pump.

Fig. 3 is a diagrammatic top plan view similar to Fig. 2 and of a positive switch structure embodiment of the invention.

In Fig. 1 of the drawings there is illustrated an outer shell 11 within which is trapped opposed or spaced magnetic discs 12 and 13 spaced apart by magnetic tube or sleeve 14 same forming a chamber 15 in which is disposed a solenoid 16 having a central bore defined by a sleeve 17 extending there through. The foregoing may be suitably supported by bracket or like means not shown.

Within the lower end of the sleeve 17 is the flanged sleeve 18 having central bore 19 therethrough. Same is tapped at 20 for connection to a liquid supply line connected to a liquid reservoir such as a fuel tank. The upper end of the bore 19 is enlarged at 21 forming a shoulder to take a spring support and check valve stop member 22 having stop portion 23 disposed in chamber 24, and enlargement of bore 19. Also in chamber 24 is the disc check valve 25.

Slidable in sleeve 17 is the tubular magnetic piston 26. Same has constriction 27 forming an

2 internal collar between the bore 28 and chamber 29. A spring 30 is nested in the sleeve 17, and bears at one end upon retainer 22 and at the opposite end bears upon the internal collar 27. This spring normally constrains the piston outwardly of solenoid. When the solenoid is energized the piston is drawn into the solenoid in opposition to said spring.

Within chamber 29 and seatable upon the internal collar is check valve (a disc) 31. A light spring 32 normally constrains same in seated relation upon collar 27. A spring retainer 33 is carried by the adjacent end of piston 26 as shown. A fixture 34 closes the end of sleeve 17 and includes restrictive discharge passage 35. This is enlarged and threaded at 36 to take a connection to the fuel atomizing unit (not shown) such as a carburetor.

Operation is as follows: When the solenoid is energized the piston is magnetically drawn into the same and at the same time valve 25 is seated and valve 31 is unseated. Liquid in the piston and sleeve above valve 25 is forced past valve 31. When the solenoid is deenergized, the spring 30 is effective to reverse piston travel. This seats valve 31 and opens valve 25 to recharge the above cylinder from the supply (not shown) such as a fuel tank. Repetitious piston reciprocation maintains liquid under pressure in the discharge line.

All the aforesaid is broadly illustrated in said patent. Herein the control for the solenoid is broadly like that shown in the patent. Such control is mounted above the solenoid and about the extended end of sleeve 17 and is contained within cap 37.

Such control comprises a relatively stationary switch member 38 having contact 38a. Terminal 39 connects thereto. A horse-shoe shaped permanent magnet 40 partially embraces the extended end of sleeve 17. A switch arm 41 of magnetic type substantially completes the embracement. Said arm at one end is pivoted at 42 and is normally constrained by spring 43 away from the magnet. Said arm, at the other end, terminates in contact 44. An adjustable stop 45 limits the gap between contacts 38a and 44 relative to the respective forces of spring 43 and magnet 40.

As in the patent, when the piston is up it provides a magnetic shunt relative to switch arm 41 so that spring 43 is effective to close the switch thus energizing the solenoid to lower the piston. When lowered the magnetic attraction between the magnet and arm 41 is sufficient to overcome spring 43 which opens the circuit. The piston is then repositioned in operative relation to the magnet by spring 30. Thus the cycle is repeated as long as the main switch (not shown) remains closed.

This structure, so far described, inherently has the objections of the patented structure. Herein there has been provided a bar magnet 46 of proper magnetic force. It is carried by the upper end of piston 26. It is so disposed that the area of chamber 29 remaining unblocked is much greater than passage 35 and at least as large or larger than the passage in collar 27.

This magnet is positioned so that its south pole is positioned contiguous to the north pole of the horseshoe magnet and vice versa. Thus the magnet serves as a magnetic reducer to a slight extent relative to the switch arm-horseshoe magnetic circuit. Thimble 33 is para-magnetic.

The pumping stroke of the piston is slightly less than the depth of magnet 40, see Fig. 1. When the pump is at rest the top of the piston is but slightly above the top level of the magnet 40. The pumping stroke termination, however, is slightly below this level.

The rapidity of operation obviously requires appreciable clearance between the piston and the cylinder wall. In the operation, therefore, since the coil is concentric to the piston and the horseshoe magnet is not concentric thereto, there will be piston slap on each stroke.

The small compensating or bleeding magnet 46 accordingly serves to continuously attract the sleeve 17 so that the piston, as it were, always hugs one side of the sleeve. Hence, there is no slap and there consequently is no noise. Note also that by virtue of opposed poles in the two magnets, see magnet polarity in Fig. 2, the bar magnet assists in pulling the piston in the pumping stroke and such assistance increases toward the end of the stroke, whereas the spring forces decrease at that end. Thus a more steady or uniform total power force is applied upon the piston throughout the pumping stroke. The inclusion of the bar magnet with poles in opposed relation as described aforesaid neutralizes a portion of the flux of the horseshoe magnet so that when the piston per se shunts a portion of such flux from the switch arm, the latter is more responsive, or faster with respect to its former action.

Should there be water entrapped in the pump and frozen therein, obviously the piston cannot move. When the main circuit is open, the piston is "up" and until the main switch, not shown, is closed, the solenoid will be deenergized. The piston is then held up (being frozen). The pump switch is closed so that when the main switch is closed, the coil heats up because it is not then intermittently energized. Such heating will then melt the ice which melting occurs before the coil can become damaged. Upon ice melting obviously the piston is solenoid attracted and normal operation thereafter results.

By way of example, normal coil current is about one and one half amperes. With a frozen piston, a dead short condition results and the coil then draws about ten and a half amperes. Such current for about a minute will locally heat the sleeve 18 and piston 26 sufficiently to thaw the ice locking them together.

It will be obvious that switch operation is repetitious and rapid. To insure positiveness of operation, a switch is provided which has a self-cleaning action and a long life. Such a switch, see Fig. 3, includes the arm 141 pivoted at 142 and constrained by spring 143 to closed circuit position. Contact 144 therefore swings on the arc indicated at A, see Fig. 3. The confronting contact 138a carried by spring arm 138 anchored at 138b and effectively swinging about center 138c has an arc of travel B, when engaged by contact 144 thus insuring a wiping contact incurring positive circuit closing and maintenance of uniformity of performance for long periods.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a reciprocating structure of the repetitious type having a solenoid, a control switch for same normally biased to one of two control positions, a plunger member movable responsive to solenoid energization and having a magnetic portion, and a permanent magnet juxtapositioned to the switch and intermittently effecting switch movement, the member sufficiently shunting the flux of the magnet in one position to secure switch operation the combination therewith of a second permanent magnet carried by the plunger member and operatively disposed relative to the plunger member magnetic portion.

2. A structure as defined by claim 1 wherein the second permanent magnet is disposed upon the plunger member in opposed pole relation with respect to the first magnet.

3. A structure as defined by claim 2 wherein the second magnet is of the bar type.

4. A structure as defined by claim 1 wherein the plunger member is of tubular piston type for pump purposes, the second permanent magnet being disposed in opposed pole relation with respect to the first magnet.

5. A structure as defined by claim 4 wherein the second magnet is of the bar type and within the piston tubularity and across the same.

WALTER E. BENJAMIN.

No references cited.